US007904499B2

(12) United States Patent
Hirairi

(10) Patent No.: US 7,904,499 B2
(45) Date of Patent: Mar. 8, 2011

(54) METHODS AND APPARATUS FOR CARRY GENERATION IN A BINARY LOOK AHEAD SYSTEM

(75) Inventor: Koji Hirairi, Atsugi (JP)

(73) Assignee: Sony Computer Entertainment Inc., Tokyo (JP)

( * ) Notice: Subject to any disclaimer, the term of this patent is extended or adjusted under 35 U.S.C. 154(b) by 995 days.

(21) Appl. No.: 11/735,600

(22) Filed: Apr. 16, 2007

(65) Prior Publication Data

US 2008/0256164 A1    Oct. 16, 2008

(51) Int. Cl.
*G06F 7/508* (2006.01)
(52) U.S. Cl. ........................................................ 708/713
(58) Field of Classification Search .................... None
See application file for complete search history.

(56) References Cited

U.S. PATENT DOCUMENTS

| 5,043,934 | A | * | 8/1991 | Lamb | 708/713 |
| 5,095,458 | A | * | 3/1992 | Lynch et al. | 708/713 |
| 5,235,539 | A | * | 8/1993 | Patel | 708/713 |
| 5,276,635 | A | * | 1/1994 | Naini et al. | 708/713 |

* cited by examiner

*Primary Examiner* — David H Malzahn
(74) *Attorney, Agent, or Firm* — Matthew B. Dernier, Esq.; Gibson & Dernier LLP

(57) ABSTRACT

Methods and apparatus provide for a carry generation tree for a carry look-ahead binary adder, which includes N stages of operators, reducers, and/or repeaters, wherein: a first of the stages receives binary outputs from a series of binary adders; a last of the stages produces a carry out signal representing the carry state of the series of binary adders; and any operator in a given stage does not receive signals from more than one operator in a preceding stage.

14 Claims, 12 Drawing Sheets

POS - NEG - POS

Pos – Neg - Pos

Neg – Pos - Neg

120  CHILD REPEATER

110B  CHILD OPERATOR

110A  OPERATOR PARENT

130B  CHILD REDUCER

PARENT REDUCER
130A

PARENT REDUCER
130A

230B CHILD REDUCER

PARENT REDUCER
130A

PARENT REDUCER
130A

METHODS AND APPARATUS FOR CARRY GENERATION IN A BINARY LOOK AHEAD SYSTEM

BACKGROUND OF THE INVENTION

The present invention relates to binary adder circuits and techniques, and more specifically to a binary look-ahead adder employing a carry generation tree.

A carry look-ahead adder can be contrasted with a simpler, but usually slower, ripple carry adder. In a ripple carry adder, each bit of the adder must wait for the carry output from less significant bits. With reference to FIG. 1, however, a carry look-ahead adder 10 includes a GP conversion circuit 12, including a plurality of GP generators, adders and a carry generation tree 14. The carry generation tree 14 operates to calculate all the carry outputs at once. Thus, instead of having to wait for the output to "ripple" up to the most significant bit, the entire result can be computed, in theory, with significantly less delay.

The conventional carry generation tree 14 is implemented using operators, reducers, and repeaters. The carry look-ahead adder 10 of FIG. 1 is a 4-bit adder, and thus the carry generation tree 14 is relatively simple: it contains an operator 16 and two reducers 18 that receive the outputs of the individual adders from the GP conversion circuit 12 and produce the carry out signal. A carry generation tree 24 for a more complex, 8-bit adder is illustrated in FIG. 2. With outputs from eight adders being received into the carry generation tree 24, there are more operators 16 employed in the circuit to produce the carry out signal.

While carry look-ahead adders are theoretically faster than ripple carry adders, they have some problems: the conventional technique for using the operators, reducers, and repeaters permits so-called "tri-connected" operators 26, in which the outputs from two operators 16 in a previous stage are input into an operator 16b at a next stage in the tree. This structure significantly reduces the speed of the tree, at least in part because of an attendant increase in the number of transistors found in critical paths through tri-connected operators and increases capacitive loads. This problem is exacerbated when the carry generation tree is designed for a non-2^n bit adder.

Accordingly, there is a need in the art for new methods and apparatus for implementing the carry generation tree, specifically to improve the speed therethrough.

SUMMARY OF THE INVENTION

In accordance with one or more embodiments of the present invention, methods and apparatus provide for implementation rules for the design of the carry generation tree. Using a parent/child analogy in reverse flow of the tree, Rule 1, a parent reducer may have two children (one operator and one reducer or one repeater and one reducer); Rule 2, a parent operator may have two children (one operator and one repeater or two operators); Rule 3, if a parent has one child such child is a operator or a repeater. When implemented, these rules ensure that the critical path(s) through the tree are not undesirably slow.

In accordance with one or more embodiments of the present invention, a carry generation tree for a carry look-ahead binary adder includes: N stages of operators, reducers, and/or repeaters, wherein: a first of the stages receives binary outputs from a series of binary adders; a last of the stages produces a carry out signal representing the carry state of the series of binary adders; and any operator in a given stage does not receive signals from more than one operator in a preceding stage.

In accordance with one or more embodiments of the invention, the carry generation tree is such that any operator in a given stage receives signals from one operator and one repeater in a preceding stage. The operator in the given stage is a parent operator and the operator and repeater in the preceding stage are children. The children receive signal (gi, pi), (gj, pj), and (gk, pk) from sources (i, j, k) in a further preceding stage, where each source consisting of an operator, reducer, or repeater.

In accordance with one or more embodiments of the invention, the carry generation tree is such that any reducer in a given stage receives signals from at least one of: one operator and one reducer in a preceding stage; and one repeater and one reducer in a preceding stage. The reducer in the given stage is a parent reducer and the operator and reducer in the preceding stage are children. The children receive signals (gi, pi), (gj, pj), (gk, pk), and (gl, pl) from sources (i, j, k, l) in a further preceding stage, each source consisting of an operator, reducer, or repeater.

Other aspects, features, and advantages of the present invention will be apparent to one skilled in the art from the description herein taken in conjunction with the accompanying drawings.

DESCRIPTION OF THE DRAWINGS

For the purposes of illustration, there are forms shown in the drawings that are presently preferred, it being understood, however, that the invention is not limited to the precise arrangements and instrumentalities shown.

DETAILED DESCRIPTION OF THE PREFERRED EMBODIMENTS

Figure 1:
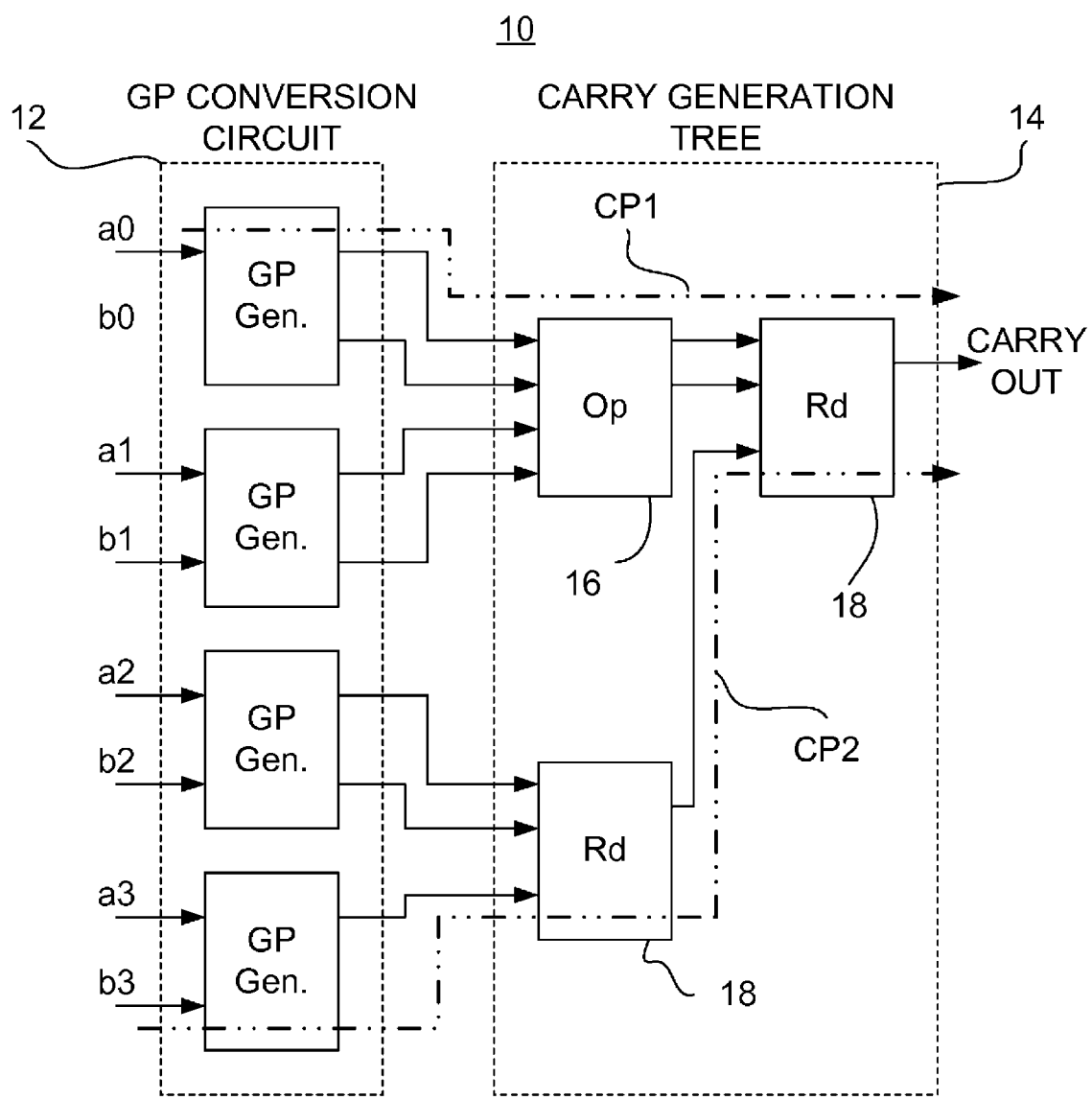
FIG. 1 is a block diagram of a carry generation tree with pg generation for a 4-bit carry look-ahead adder in accordance with the prior art.
Figure 2:
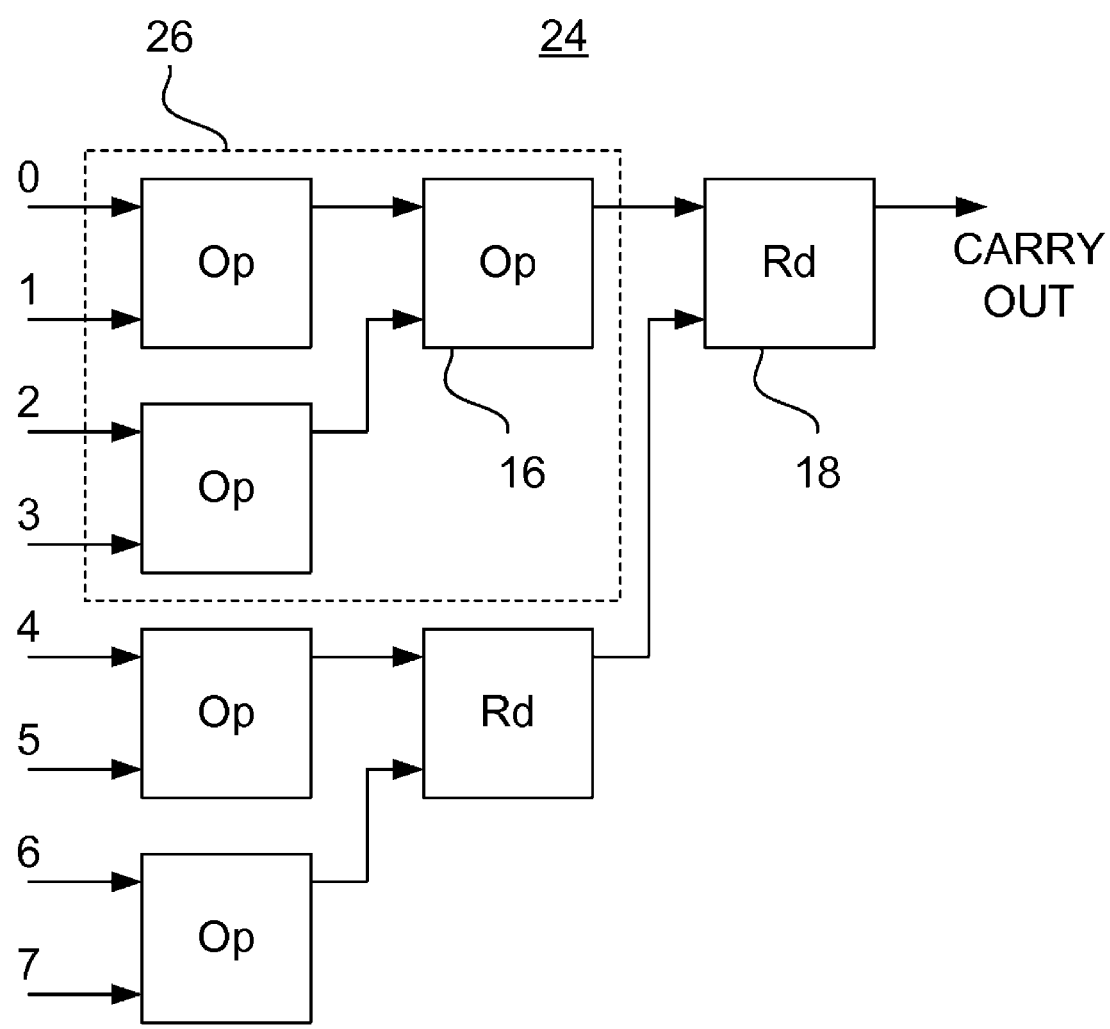
FIG. 2 is block diagram of a carry generation tree for an 8-bit carry look-ahead adder in accordance with the prior art.
Figure 3:
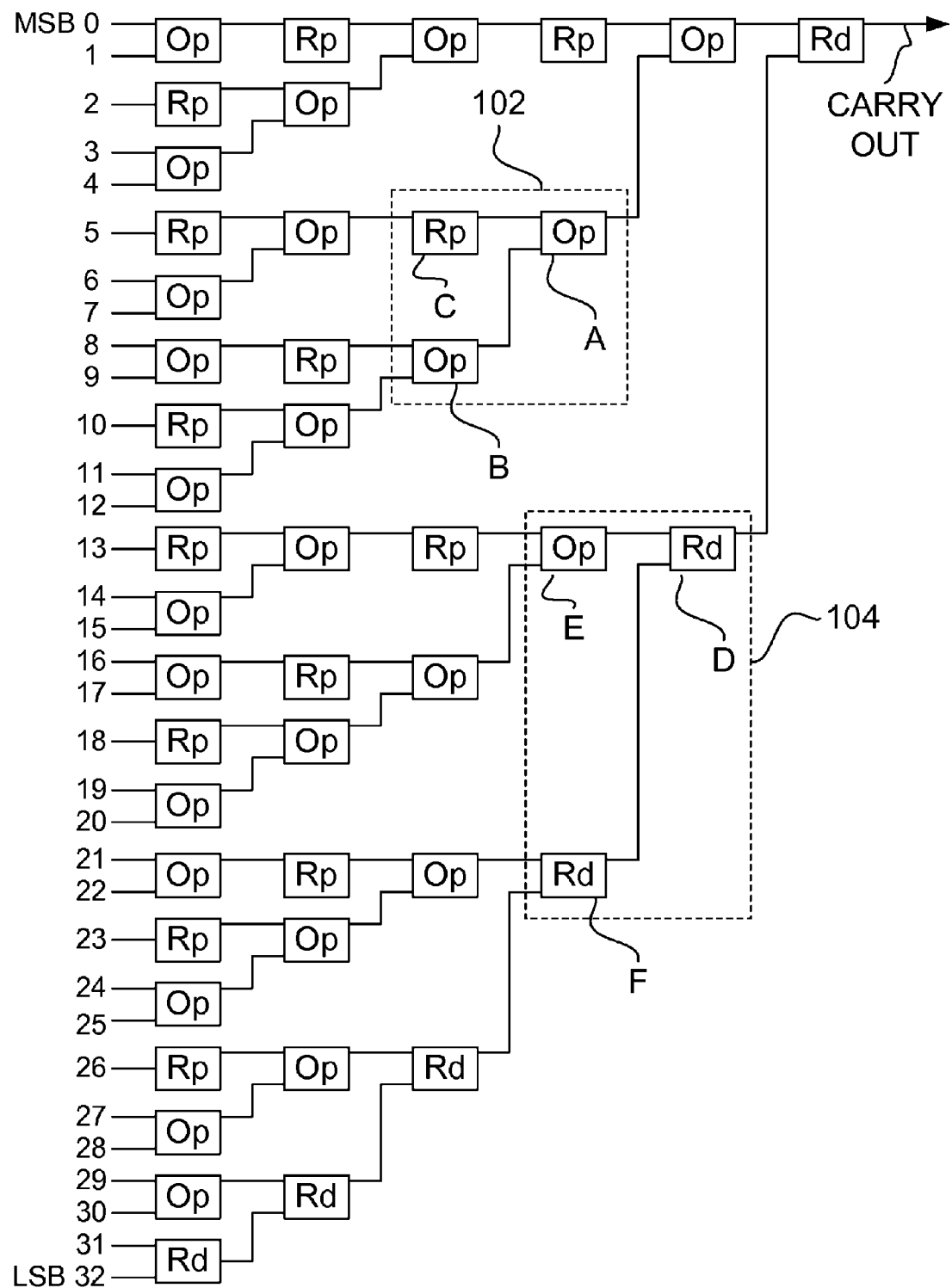
FIG. 3 is block diagram of a carry generation tree for a 33-bit carry look-ahead adder in accordance with one or more embodiments of the present invention.

With reference to the drawings, wherein like numerals indicate like elements, there is shown in FIG. 3 a block diagram of a carry generation tree 100 in accordance with one or more aspects of the present invention. The carry generation tree 100 is operable to produce a carry out signal based on signals received from a 33-bit carry look-ahead binary adder (not shown). Thus, the generation tree 100 receives inputs from a non-$2^n$ bit source (in this case the carry look-ahead binary adder). The carry generation tree 100 includes a plurality of stages, where each stage includes one or more operators (Op), reducers (Rd) and/or repeaters (Rp). In the illustrated example, the carry generation tree 100 includes six stages. One skilled in the art will appreciate that while the carry generation tree 100 of FIG. 3 is designed to work in conjunction with a 33-bit carry look-ahead binary adder, any size adder may be employed by adjusting the configuration of the operators, reducers, and/or repeaters.

The first stage receives binary outputs from a series of binary adders of the carry look-ahead binary adder. The most significant bit (MSB) of these binary outputs is numbered 0, while the least significant bit (LSB) is numbered 32. The next stage of the carry generation tree 100 includes a number of operators, repeaters, and reducers that receive binary signals from the operators, repeaters and reducers of the prior stage. This continues to the last stage, which includes a reducer, at which the carry out signal is produced.

Notably, any operator in a given stage does not receive signals from more than one operator in a proceeding stage. For example, with reference to circuit block 102, operator A receives binary signaling from only operator B (and no other operators) and repeater C. This arrangement, where circuit blocks having three operators are avoided, is carried through in all stages of the carry generation tree 100. Advantageously, this arrangement avoids the problems associated with the tri-connected operators of the prior art. These characteristics will be discussed in more detail later herein.

In accordance with one or more aspects of the present invention, any reducer in a given stage receives signals from at least one of: (i) one operator and one reducer in a preceding stage; and (ii) one repeater and one reducer in a preceding stage. The former is preferred. For example, with reference to circuit block 104, the reducer D receives binary signaling from one operator E and one reducer F. A review of the illustrated carry generation tree 100 reveals that this constraint is carried throughout.

Figure 4:
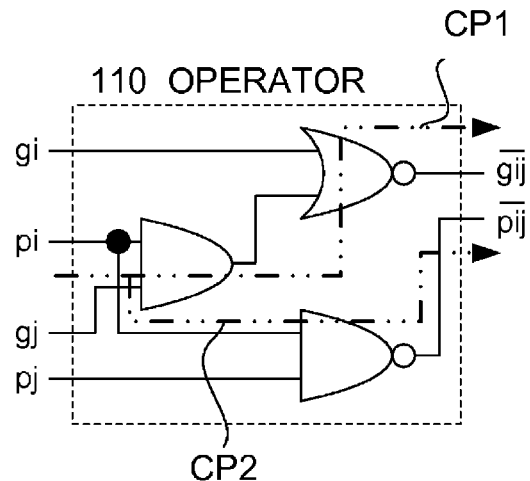
FIGS. 4-5 are detailed logic circuit diagrams of an operator that may be used in a carry generation tree of one or more embodiments of the present invention, each showing respective critical paths therethrough.

In order to more fully appreciate the advantages of the techniques employed in producing the carry generation tree 100 of FIG. 3, further details of the implementation of the operator circuits will now be discussed. With reference to FIG. 4, a logic circuit diagram of an operator 110 is illustrated. The operator 110 receives binary signals (gi, pi) and (gj, pj) from a prior stage in the carry generation tree 100. The operator 110 produces output signals gij-bar and pij-bar in response to the input binary signals. As will be discussed in more detail below, the pi signal is heavily loaded (usually capacitively loaded) by the transistor circuitry that is used to implement the logic gates of the operator 110. This results in relatively slow response times from transitions in the pi input signal to the gij-bar and pij-bar output signals (i.e., critical paths CP1 and CP2).

Figure 6:
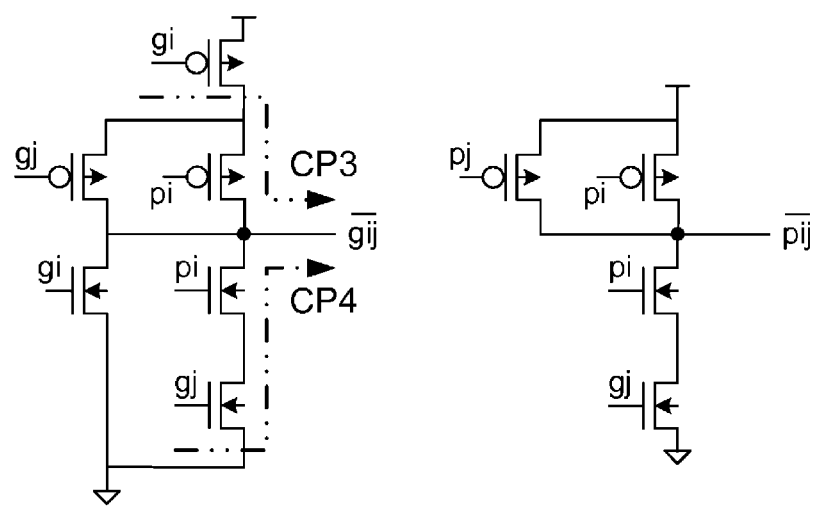
FIGS. 6-7 are two examples of detailed circuit-level implementations for the operators of FIGS. 4-5.

FIG. 6 illustrates a transistor level implementation of the operator 110 of FIG. 4. A review of the circuit reveals that the pi signal is coupled to four separate transistors, resulting in a relatively heavy load (low equivalent impedance, especially at thigh frequencies) on the signal. This results in a relatively slow response time of the operator 110, at least with respect to transitions in the pi input signal to gij-bar and pij-bar output signals, CP1 and CP2.

Figure 5:
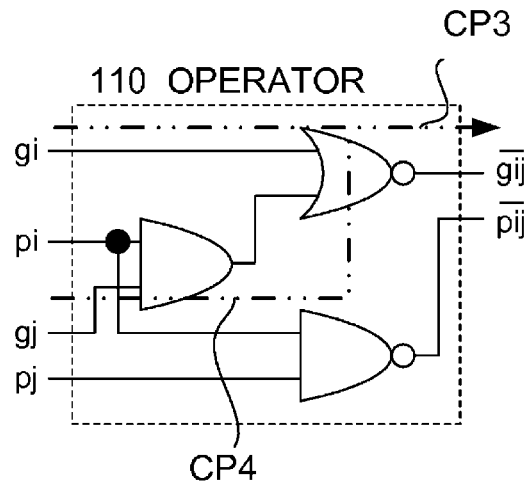

With reference to FIG. 5, different critical paths through the operator 110 are considered. In particular, critical path CP3 is defined between input signal gi and output signal gij-bar, while critical path CP4 is defined between input signal gj and output signal gij-bar. Referring again to FIG. 6, critical paths CP3 and CP4 pass through two transistors, specifically in the case of a falling edge on the gi signal or a rising edge on the gj signal. Thus, critical paths CP3 and CP4 become relatively slow signal paths.

Figure 7:
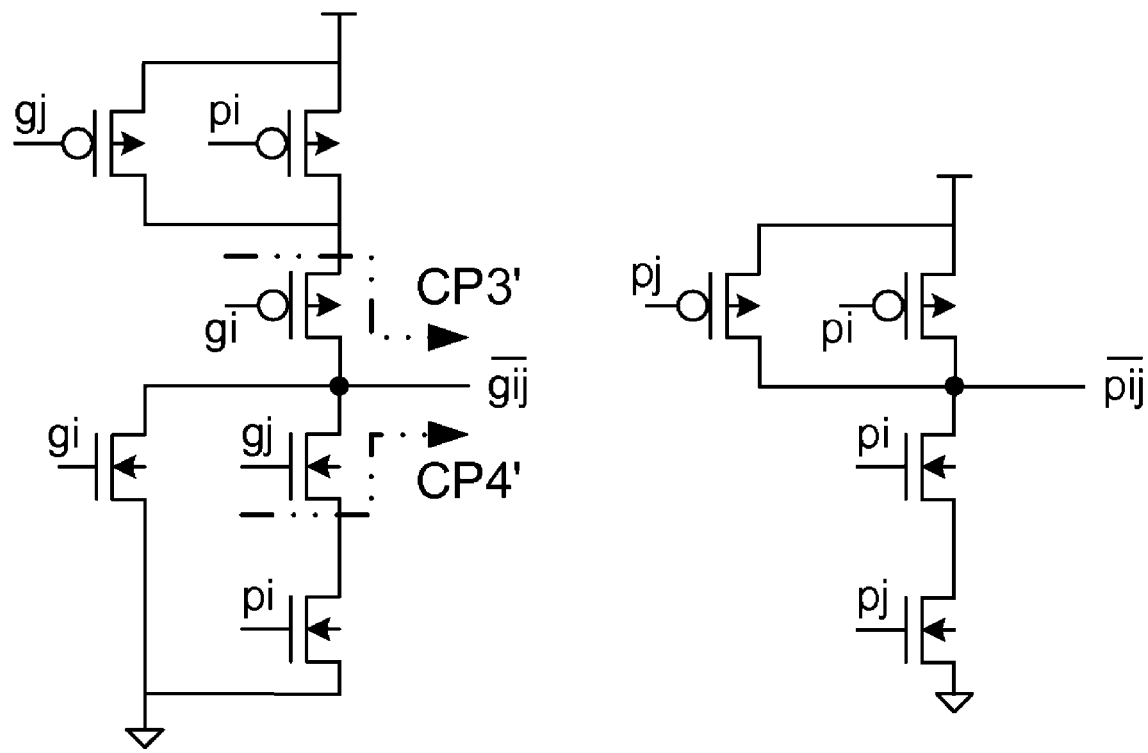

With reference to FIG. 7 an alternative transistor level circuit implementation of the operator 110 is illustrated in which the critical paths CP3' and CP4' pass through one transistor each upon a falling edge on the gi signal and a rising edge on the gj signal. While this may improve the speed of critical paths CP3' and CP4', the relatively heavy capacitive load on the pi signal remains. In addition, the pi signal has to pass through two transistors to reach the output gij-bar.

The above characteristics of the transistor level circuit implantations of the operator 110 illustrated in FIGS. 6 and 7 exhibit some advantageous characteristics and some disadvantageous characteristics, depending on where they are located in the carry generation tree 100 and which direction the input signals are transitioning.

As to the circuit implementation of FIG. 6, when the operator 110 is disposed in a positive-in, negative-out portion of the carry generation tree 100, then the speed from the input signal gi to the output signal gij-bar is slow on a falling edge of gi. Further, the speed from the input signal gj to the output signal gij-bar is slow at a rising edge of the input signal gj. Still further, the speed from the input signal pi to the output signal gij-bar is slow due to heavy loading.

A variation in the circuit of FIG. 6 involves switching the input signals pi and gj to the n-MOS transistors in the CP4 signal path. This provides different operational characteristics. In particular, with such a modification, the gj input signal to gij-bar output signal exhibits a relatively fast characteristic, the gi signal path remains unchanged, and the pi input signal to gij-bar output signal exhibits a relatively slow characteristic at a falling edge and an extraordinarily slow characteristic at a rising edge.

In contrast, the implementation of the operator 110 of FIG. 7 in the positive-in, negative-out locations of the carry generation tree 100 exhibits a relatively fast characteristic from input signal gi to output signal gij-bar, while exhibiting relatively slow characteristics of the input signal gj to output signal gij-bar upon a falling edge. Further, the circuit exhibits an extraordinarily slow characteristic from input signal pi to output signal gij-bar.

Those skilled in the art will appreciate that other transistor level implementations of the operator circuit 110 will exhibit slightly different characteristics, some advantageous and some disadvantageous, depending on where they are located in the carry generation tree 100 and which direction the input signals are transitioning. Thus, although further examples will not be discussed in detail here, suffice it to say that such exist and are available to skilled artisans.

Figure 8:
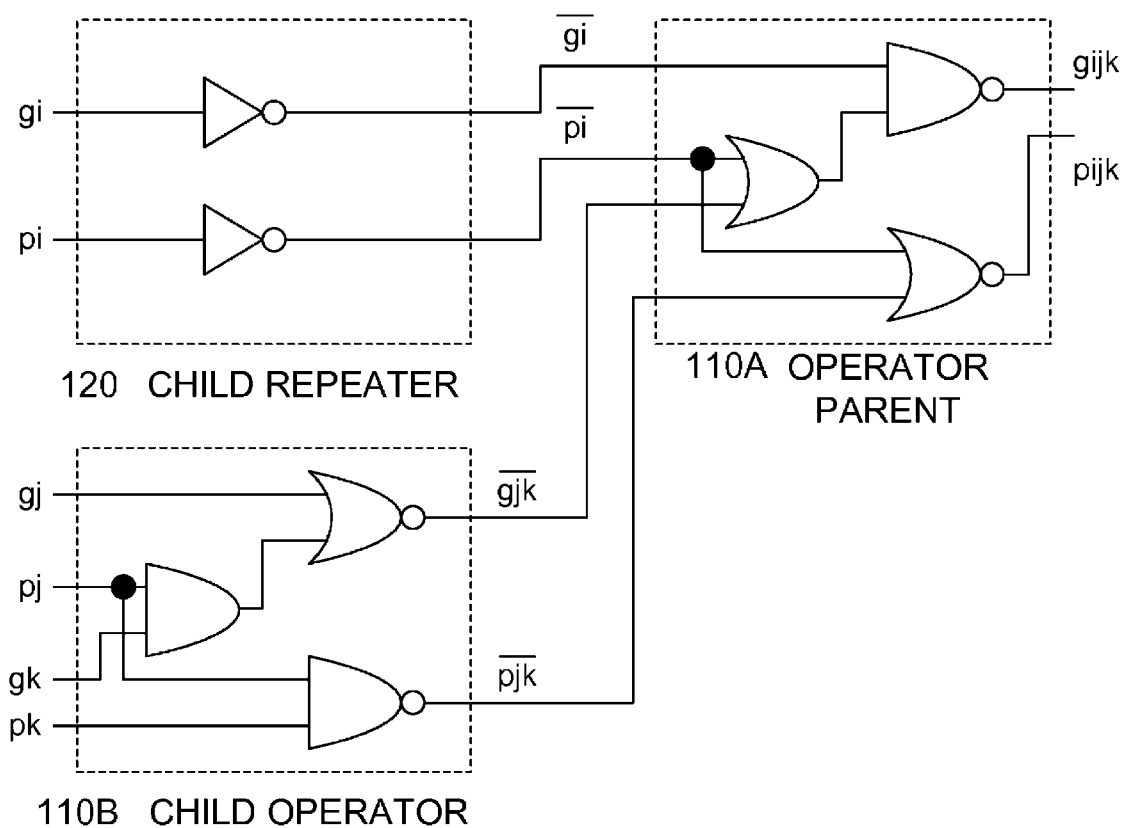
FIG. 8 is a detailed logic circuit diagram of a parent/child combination of operators and repeater that may be used in the carry generation tree of FIG. 3.
Figure 9:
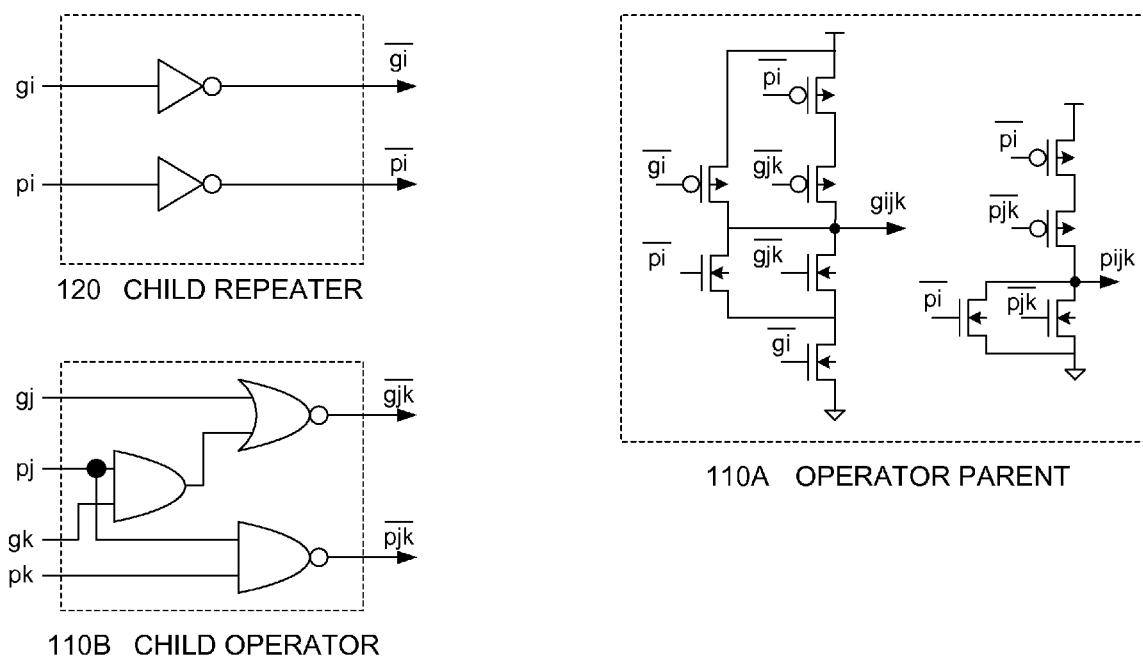
FIGS. 9-10 are two examples of detailed circuit-level implementations for the parent operators of FIG. 8.

The sometimes conflicting advantages and disadvantages of the transistor-level circuit implementations of the operator 110, which depend on input signal transition direction and location within the carry generation tree 100, have been exploited by the inventors to achieve a more optimum solution for implementing the carry generation tree 100. For example, with reference to FIGS. 8-9, when the parent operator 110A, child operator 110B, and child repeater 120 trio are in the positive-negative-positive (Pos-Neg-Pos) arrangement within the carry generation tree 100, the logical level implementation of the operators 110A and 110B are advantageously as illustrated in FIG. 8. In addition, the transistor-level implementation of the parent operator 110A is preferably that illustrated in FIG. 9. It is noted that the optimal transistor implementation of the operator child 110B depends on the implementation of a prior stage. Advantageously, the characteristics of the circuit arrangement illustrated in FIGS. 8-9 results in relatively fast characteristics for the gi and pi input signals, thereby vastly improving the speed to the output signals gijk and pijk.

Figure 10:
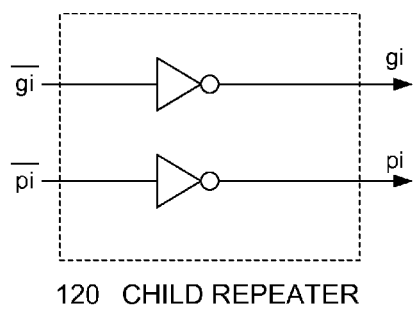
Figure 10:
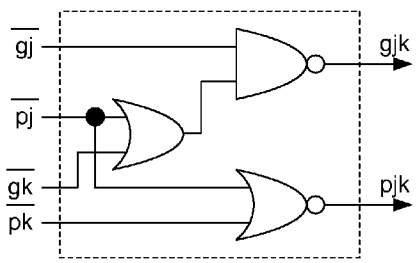
Figure 10:
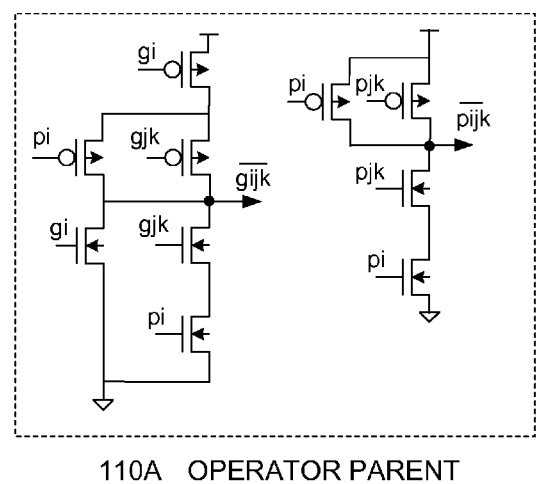

By way of further example, with reference to FIG. 10, when the parent operator 110A, child operator 110B, and child repeater 120 trio are in the negative-positive-negative (Neg-Pos-Neg) arrangement within the carry generation tree 100, the logical level implementation of the child operator 110B and the transistor level implementation of the parent operator 110A are advantageously as illustrated. It is noted that the optimal transistor level implementation of the operator child 110B depends on the implementation of a prior stage. Advantageously, the characteristics of the circuit arrangement illustrated in FIG. 10 results in relatively fast characteristics for the gi-bar and pi-bar input signals, thereby vastly improving the speed to the output signals gijk-bar and pijk-bar.

With reference to FIGS. 11A-11F, in the case of a parent reducer 130A and child reducer 130B trio, advantageous circuit operation may be achieved through careful selection of the transistor level implementations of the respective reducers. For example, when in a positive-negative-positive location within the carry generation tree 100, a child reducer 130 may have the logical level circuit implementation illustrated in FIG. 11A, while the parent reducer 130A may have the transistor-level circuit implementation shown in either FIG. 11B or FIG. 11C. The particular transistor-level circuit implementation of the child reducer 130B will depend on which circuit implementation of the parent reducer 130A is chosen.

Figure 11A:
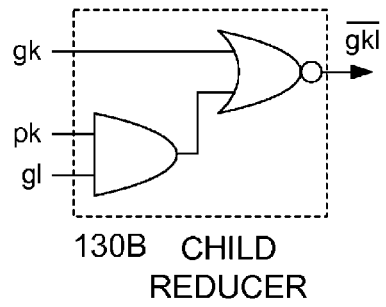
FIGS. 11A, 11B, 11C, 11D, 11E, 11F are examples of detailed logic and circuit-level implementations of the parent and child reducers in a parent/child combination of reducers and operator that may be used in the carry generation tree of FIG. 3.
Figure 11B:
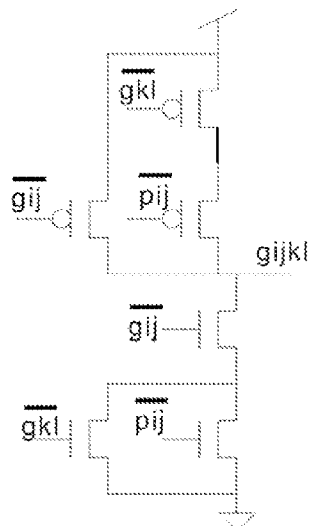
Figure 11C:
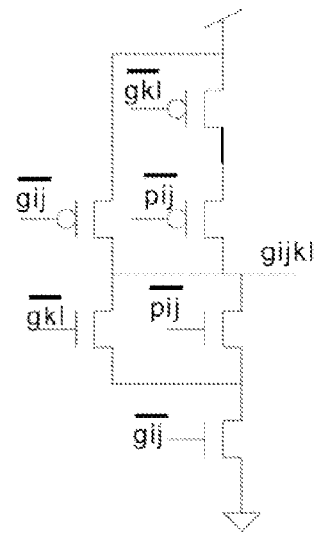
Figure 11D:
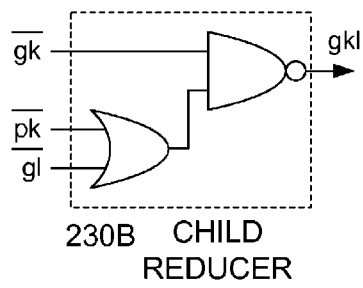
Figure 11E:
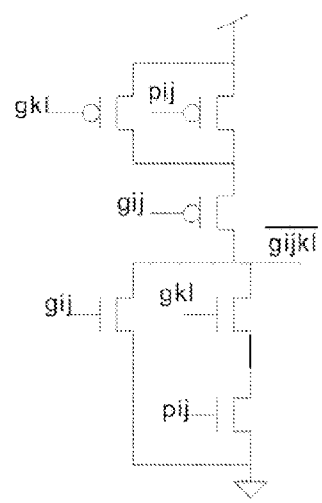
Figure 11F:
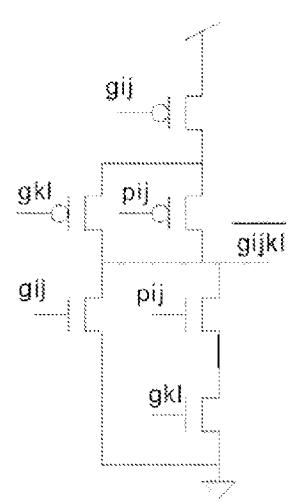

Similarly, with reference to FIGS. 11D-11F, when in the negative-positive-negative location within the carry generation tree 100, the child reducer 130B may have the logic-level circuit implementation illustrated in FIG. 11D. The parent reducer 130A may have the transistor-level circuit implementation of either that illustrated in FIG. 11E or that illustrated in FIG. 11F. Again, the transistor-level circuit implementation of the child reducer 130B, if chosen with care, as a function of the implementation of the parent reducer, may result in advantageous characteristics.

Figure 12A:
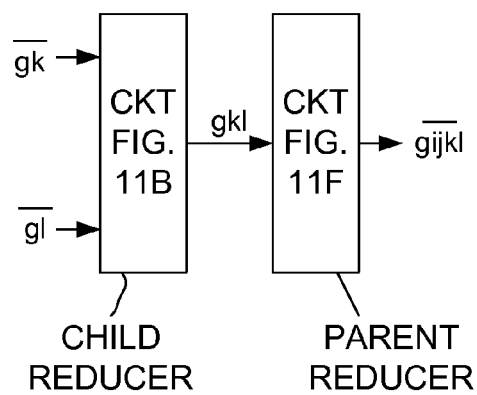
FIGS. 12A, 12B, 12C, 12D are examples of the pairing of specific circuit-level implementations of the child reducer as a function of the parent reducer in the parent/child combination of reducers and operator that may be used in the carry generation tree of FIG. 3.
Figure 12B:
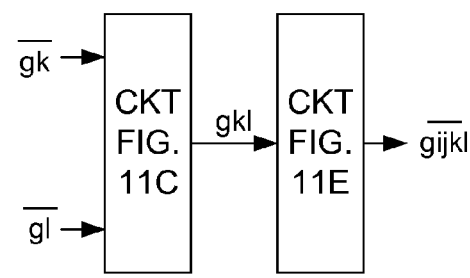
Figure 12C:
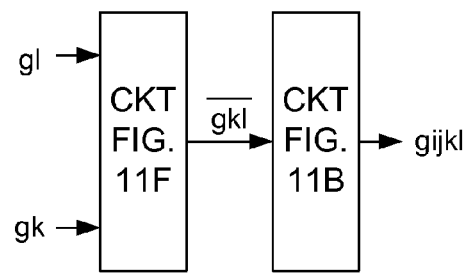
Figure 12D:
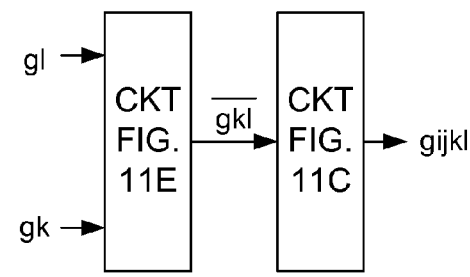

FIGS. 12A-12D illustrate advantageous transistor-level circuit implementations of the child reducer and parent reducer. In each case, the transistor-level implementation of the child reducer is a function of the implementation chosen for the parent reducer. Thus, in the circuit of FIG. 12A, a transistor-level circuit implementation of the parent reducer of FIG. 11F has been chosen. Advantageous circuit operation is achieved when the child reducer is implemented utilizing the transistor-level design of FIG. 11B. In the circuit of FIG. 12B, a transistor-level circuit implementation of the parent reducer of FIG. 11E has been chosen, and advantageous circuit operation is achieved when the child reducer is implemented utilizing the transistor-level design of FIG. 11C. By way of further example, in the circuit of FIG. 12B, a transistor-level circuit implementation of the parent reducer of FIG. 11B has been chosen, and advantageous circuit operation is achieved when the child reducer is implemented utilizing the transistor-level design of FIG. 11F. Further, in the circuit of FIG. 12D, a transistor-level circuit implementation of the parent reducer of FIG. 11C has been chosen, and advantageous circuit operation is achieved when the child reducer is implemented utilizing the transistor-level design of FIG. 11E.

Figure 13:
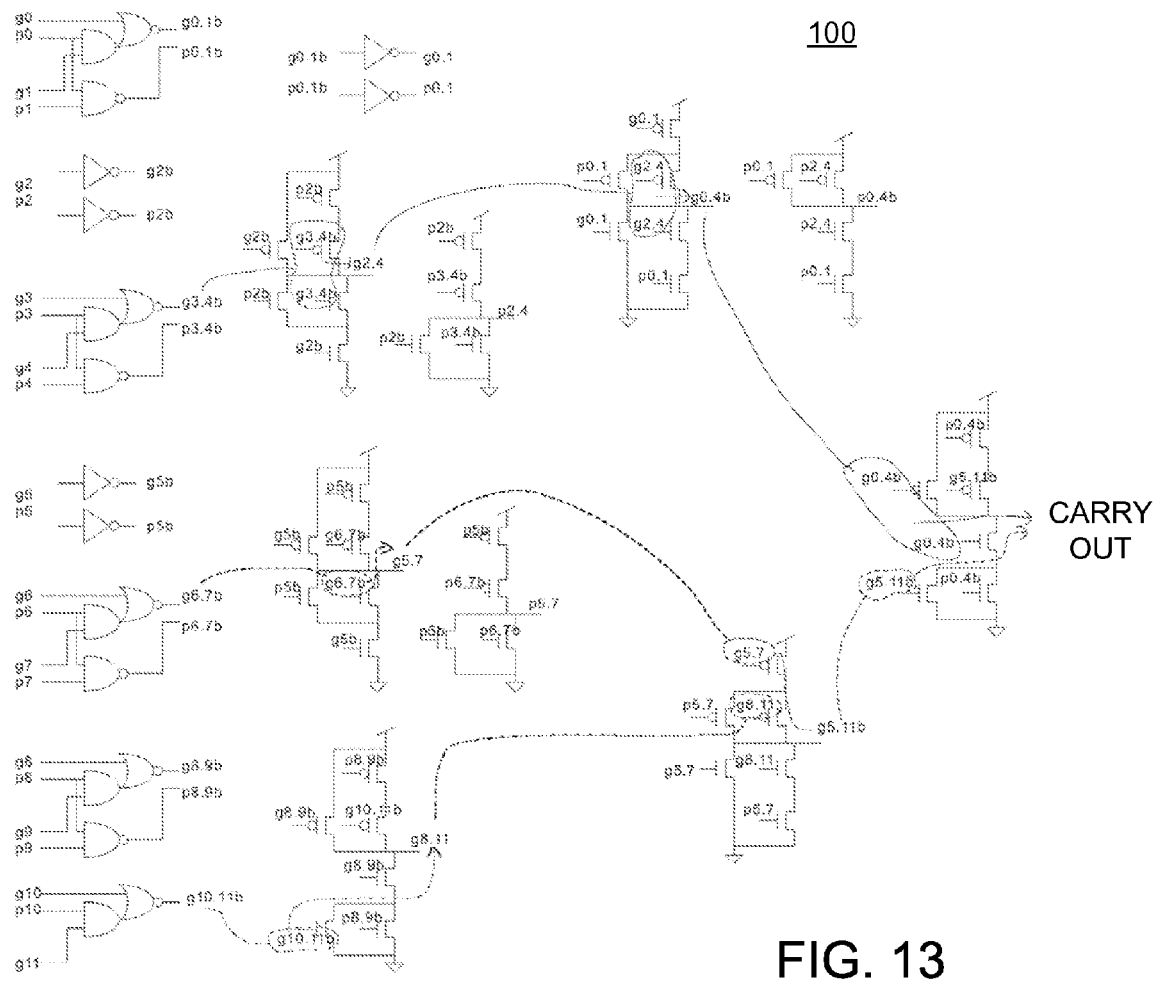
FIG. 13 is an example of a circuit-level implementation of a carry generation tree for a 12-bit carry look-ahead adder using some of the circuit-level implementations of the operator(s) and reducer(s) shown in FIGS. 9-12.

FIG. 13 is a transistor-level circuit implementation of a carry generation tree 200 for a 12-bit carry look-ahead binary adder (not shown) in which the particular implementations of the respective operators and reducers are selected in accordance with the above-described preferences in order to achieve a carryout signal that does not exhibit the disadvantageous characteristics of the prior art.

It is noted that the methods and apparatus described thus far and/or described later in this document may be achieved utilizing any of the known technologies, such as standard digital circuitry, analog circuitry, microprocessors, digital signal processors, any of the known processors that are operable to execute software and/or firmware programs, programmable digital devices or systems, programmable array logic devices, or any combination of the above, including devices now available and/or devices which are hereinafter developed.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A carry generation tree for a carry look-ahead binary adder, comprising:
N stages of one or more operators, and one or more reducers, wherein N is greater than or equal to 2 and:
a first of the stages receives binary outputs from a series of binary adders;
a last of the stages produces a carry out signal representing a carry state of the series of binary adders;
each of the one or more operators combines a plurality of inputs to produce at least two outputs, and
each of the one or more operators in a given stage, except for the first stage, does not receive signals from more than one other of the one or more operators in an immediately preceding stage;
each of the one or more reducers combines a plurality of inputs to produce a single output in any given stage and
each of the one or more reducers in a given stage, except the first stage, receives signals from one of the one or more operators and one of the one or more reducers in an immediately preceding stage.

2. The carry generation tree of claim 1, wherein the N stages are operable to receive a number of bits from the carry look-ahead binary adder that is not $2^n$, where n is an integer.

3. The carry generation tree of claim 1, further comprising at least one repeater, wherein any operator in a given stage, except the first stage, receives signals from one operator and one repeater in a preceding stage.

4. The carry generation tree of claim 3, wherein:
the operator in the given stage is a parent operator and the operator and repeater in the preceding stage are children; and
the children in each stage, except the first stage, receive signal (gi, pi), (gj, pj), and (gk, pk) from sources (i, j, k)

in a further preceding stage, each source consisting of an operator, reducer, or repeater.

5. The carry generation tree of claim 4, wherein the child operator in the preceding stage has a logic configuration that produces two outputs $(\overline{p_j * p_k})$ and $[\overline{(p_j * g_k) + g_j}]$.

6. The carry generation tree of claim 4, wherein the child operator in the preceding stage has a logic configuration that produces two outputs $(\overline{p_j + p_k})$ and $[\overline{g_j} * (\overline{p_j + g_k})]$.

7. The carry generation tree of claim 3, wherein any reducer in a given stage except the first stage, receives signals from
one repeater and one reducer in a preceding stage.

8. The carry generation tree of claim 7, wherein:
the reducer in the given stage is a parent reducer and the operator and reducer in the preceding stage are children; and
the children receive signals (gi, pi), (gj, pj), (gk, pk), and (gl, pl) from sources (i, j, k, l) in a further preceding stage, each source consisting of an operator, reducer, or repeater.

9. The carry generation tree of claim 8, wherein the child reducer in the preceding stage has a logic configuration that produces the single output $[\overline{(p_k * g_l) + g_k}]$.

10. The carry generation tree of claim 8, wherein the child reducer in the preceding stage has a logic configuration that produces the single output $[\overline{(p_k + \overline{g_l}) * \overline{g_k}}]$.

11. A carry look-ahead binary adder, comprising:
a series of binary adders; and
a carry generation tree including N stages of at least operators and reducers, wherein N≧2 and:
a first of the stages receives binary outputs from the binary adders;
a last of the stages produces a carry out signal representing the carry state of the series of binary adders;
any operator combines a plurality of inputs to produce at least two outputs,
each operator in a given stage, except the first stage, does not receive signals from more than one operator in an immediately preceding stage,
each of the one or more reducers combines a plurality of inputs to produce a single output in any given stage, and
each of the reducers in a given stage, except the first stage, receives signals from one of the one or more operators and one of the one or more reducers in an immediately preceding stage.

12. The carry look-ahead binary adder of claim 11, further comprising repeaters wherein any operator in a given stage receives signals from one operator and one repeater in a preceding stage.

13. A system, comprising:
a carry look-ahead binary adder having a series of binary adders;
a carry generation tree including N stages of at least operators and reducers, wherein N≧2 and:
a first of the stages receives binary outputs from the series of binary adders;
a last of the stages produces a carry out signal representing the carry state of the series of binary adders;
any operator combines a plurality of inputs to produce at least two outputs, each operator in a given stage, except the first stage, does not receive signals from more than one operator in an immediately preceding stage; and
each of the one or more reducers combines a plurality of inputs to produce a single output in any given stage, and
each of the reducers in a given stage, except the first stage, receives signals from one of the one or more operators and one of the one or more reducers in an immediately preceding stage.

14. A method, comprising:
providing a carry look-ahead binary adder having a series of binary adders;
providing a carry generation tree including N stages of at least operators and reducers, wherein N≧2,
receiving binary outputs from the series of binary adders at a first of the stages;
producing a carry out signal representing the carry state of the series of binary adders at a last of the stages;
not receiving signals at any operator in a given stage, except for the first stage, from more than one operator in an immediately preceding stage wherein each operator combines a plurality of inputs to produce at least two outputs;
receiving signals at each of the reducers in a given stage, except the first stage, from one of the operators and one of the reducers in an immediately preceding stage, wherein each of the reducers combines a plurality of inputs to produce a single output in any given stage.

* * * * *